(12) United States Patent
Zhao et al.

(10) Patent No.: US 10,701,553 B2
(45) Date of Patent: Jun. 30, 2020

(54) SIGNALING AN INDICATION OF A USER DEVICE TYPE TO A NETWORK TO ALLOW AN OPTIMIZED NETWORK CONFIGURATION FOR THE USER DEVICE

(71) Applicant: Verizon Patent and Licensing Inc., Arlington, VA (US)

(72) Inventors: Hui Zhao, Marlboro, NJ (US); Andrew E. Youtz, Princeton, NJ (US); Lily Zhu, Parsippany, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/131,816

(22) Filed: Sep. 14, 2018

(65) Prior Publication Data
US 2020/0092712 A1     Mar. 19, 2020

(51) Int. Cl.
*H04W 8/24*     (2009.01)
*H04W 24/02*     (2009.01)
*H04W 52/02*     (2009.01)
*H04W 84/04*     (2009.01)
*H04B 7/0413*     (2017.01)
*H04L 29/08*     (2006.01)

(52) U.S. Cl.
CPC ............. *H04W 8/24* (2013.01); *H04W 24/02* (2013.01); *H04W 52/0225* (2013.01); *H04B 7/0413* (2013.01); *H04L 67/10* (2013.01); *H04W 84/042* (2013.01)

(58) Field of Classification Search
CPC ... H04W 8/24; H04W 24/02; H04W 52/0225; H04W 84/042; H04B 7/0413; H04L 67/10
See application file for complete search history.

(56) References Cited

U.S. PATENT DOCUMENTS

| 2012/0184281 A1* | 7/2012 | Kim ................. H04W 72/0453 455/450 |
| 2012/0207130 A1* | 8/2012 | Jang ........................ H04W 8/24 370/331 |
| 2019/0110190 A1* | 4/2019 | Van Lieshout ......... H04W 4/50 |

* cited by examiner

*Primary Examiner* — Thai Nguyen

(57) ABSTRACT

A device receives information identifying device types associated with respective user devices, and determines a mechanism to indicate a device type, of the device types, to a network device associated with a network. The device type is associated with a user device of the respective user devices, and the mechanism includes a device type field, a device profile identifier, or an assistance information message that indicate the device type of the user device to the network device. The device provides, to the user device via the network device, information identifying the mechanism to indicate the device type of the user device to the network device. The information identifying the mechanism enables the user device to utilize the mechanism to indicate the device type of the user device to the network device.

20 Claims, 11 Drawing Sheets

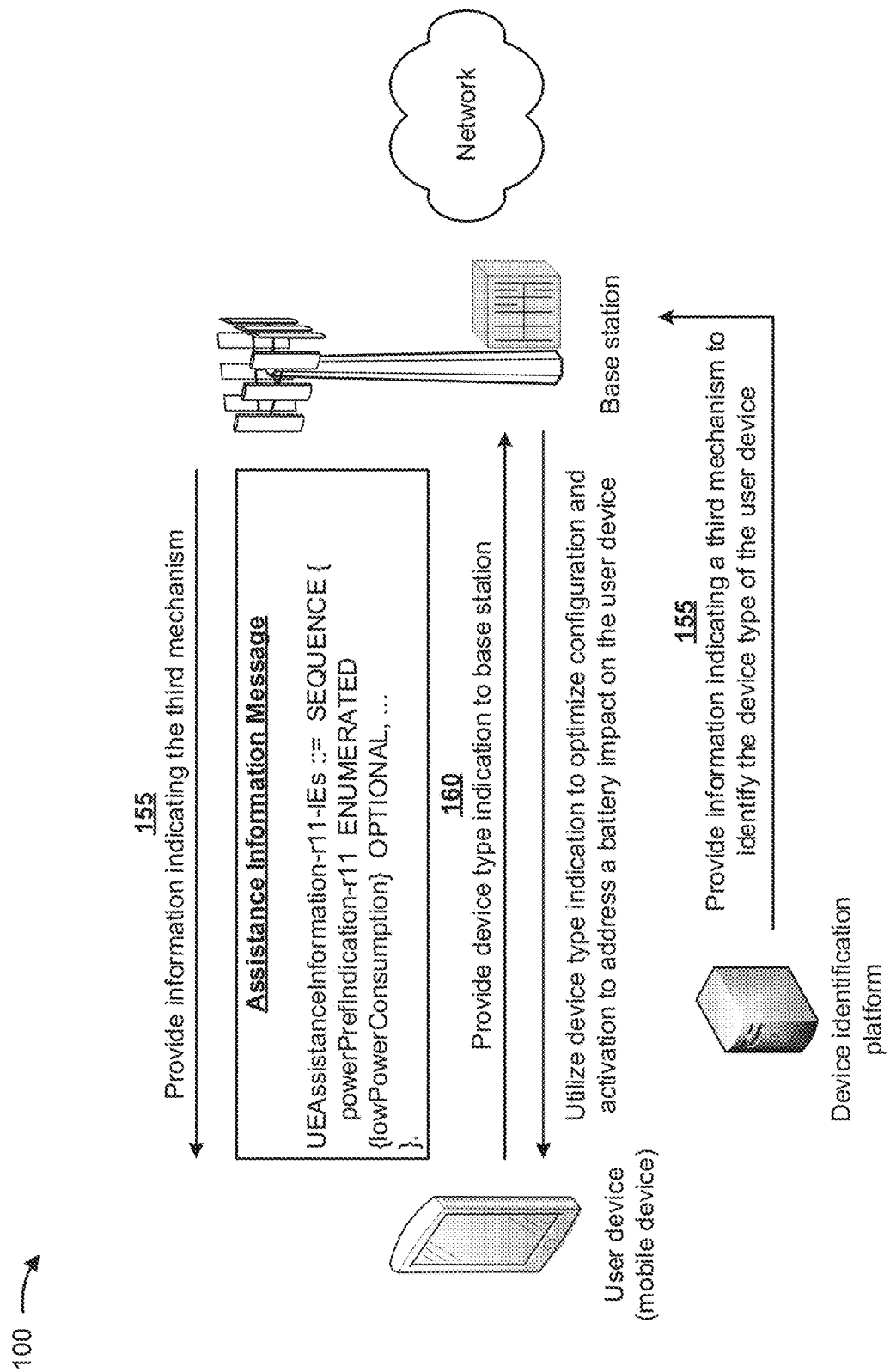

SIGNALING AN INDICATION OF A USER DEVICE TYPE TO A NETWORK TO ALLOW AN OPTIMIZED NETWORK CONFIGURATION FOR THE USER DEVICE

BACKGROUND

There are different types of user devices (e.g., user equipment or UEs) that utilize a network (e.g., a cellular network) and require different configurations and/or control from the network side to achieve a particular performance. For example, a fifth generation (5G) network can be utilized by user devices, such as mobile devices (e.g., smartphones, tablet computers, and/or the like), fixed wireless access (FWA) devices (e.g., active antenna systems (AAS), multiple input/multiple output (MIMO) devices, integrated transmit and receive modules, and/or the like), and/or the like.

BRIEF DESCRIPTION OF THE DRAWINGS

FIGS. 1A-1G are diagrams of an example implementation described herein.

DETAILED DESCRIPTION OF PREFERRED EMBODIMENTS

Figure 1A:
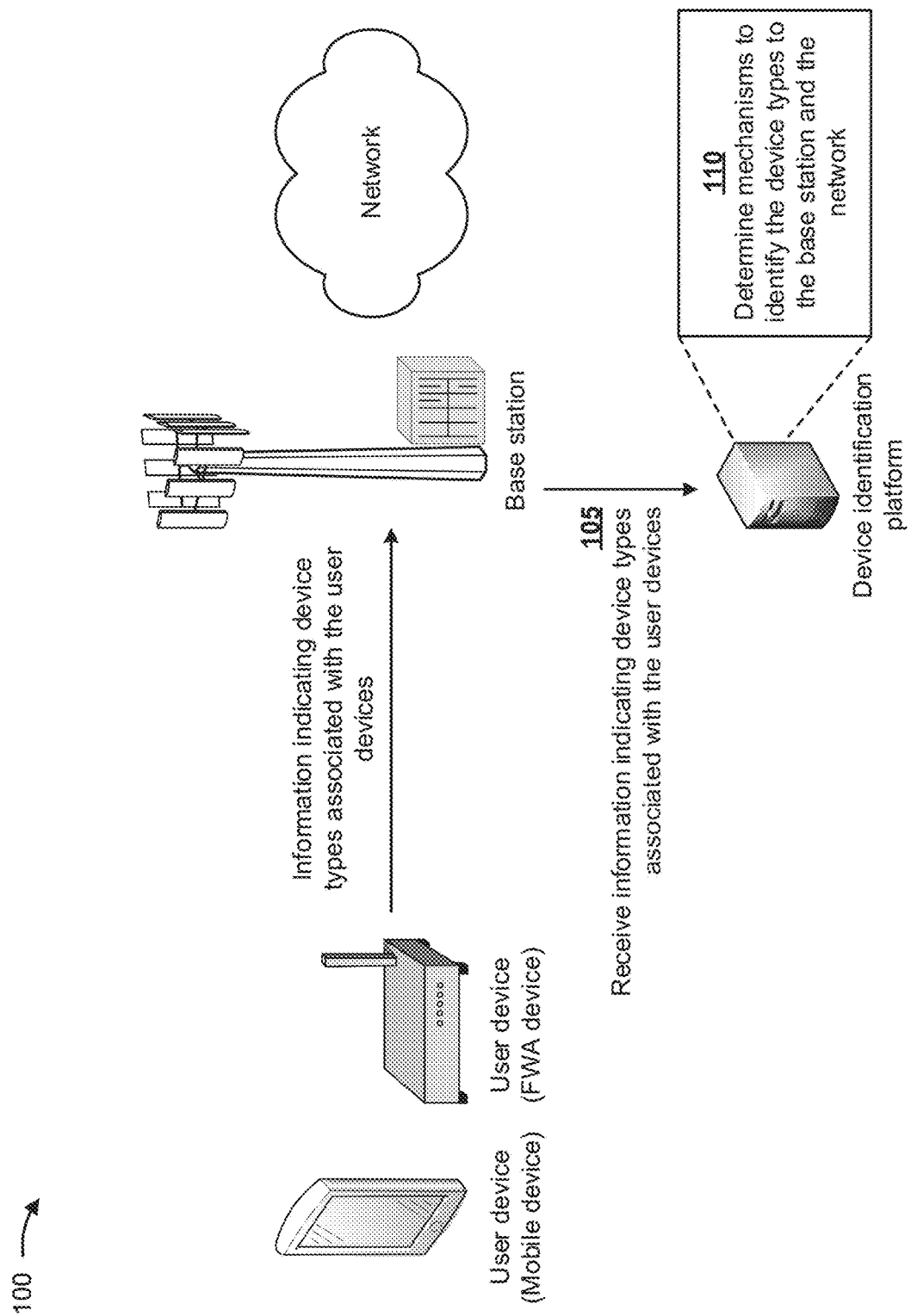

The following detailed description of example implementations refers to the accompanying drawings. The same reference numbers in different drawings can identify the same or similar elements.

A mobile device and a FWA device require different network configurations and control from a network. For example, to minimize an impact on a battery of the mobile device, a network should utilize a data threshold to shift data between a radio access network and a core network (e.g., a 5G new radio network). Battery consumption is not an issue for a FWA device (e.g., since the FWA device receives power from a customer premises), and the network need not utilize the data threshold to shift data between the radio access network and the core network. For example, the FWA device should be configured with a network connection as soon as the FWA device is in a radio resource control (RRC) connected mode. The FWA device requires a different uplink/downlink split ratio than required by the mobile device. The FWA device also includes a longer RRC inactivity timer to keep the FWA device in a connected mode longer as compared to the mobile device. However, since the network cannot distinguish between different types of user devices (e.g., a mobile device or a FWA device), the network is unable to apply different network configurations to different types of user devices.

Some implementations described herein provide a device identification platform that signals an indication of a user device type to a network to allow an optimized network configuration for the user device. For example, the device identification platform can receive information identifying multiple device types associated with respective multiple user devices, and can determine a mechanism to indicate a device type, of the multiple device types, to a network device associated with a network. The device type can be associated with a user device of the respective plurality of user devices, and the mechanism can include a device type field that indicates the device type of the user device to the network device, a device profile identifier that indicates the device type of the user device to the network device, or an assistance information message that indicates the device type of the user device to the network device. The device identification platform can provide, to the user device and via the network device, information identifying the mechanism to indicate the device type of the user device to the network device, wherein the information identifying the mechanism can enable the user device to utilize the mechanism to indicate the device type of the user device to the network device.

In this way, the device identification platform enables a network to distinguish between different types of user devices (e.g., a mobile device or a FWA device), and to apply different network configurations to different types of user devices. For example, if a user device is identified as a mobile device, the network can utilize the identification of the mobile device to optimize a configuration and an activation of the mobile device and minimize an impact on a battery of the mobile device. If the user device is identified as a FWA device, the network can utilize the identification of the FWA device to configure the FWA device with a network connection as soon as the FWA device is in a RRC connected mode, to provide a correct uplink/downlink split ratio for the FWA device, and to provide a longer RRC inactivity timer to keep the FWA device in a connected mode longer.

FIGS. 1A-1G are diagrams of an example implementation 100 described herein. As shown in FIGS. 1A-1G, two user devices (e.g., a mobile device and a FWA device) can be associated with a device identification platform, a base station, and a network. The user devices may provide, to the base station, information indicating device types associated with the user devices. As shown in FIG. 1A, and by reference number 105, the device identification platform can receive, from the base station, the information indicating the device types associated with the user devices. For example, the device identification platform can receive, from the mobile device and via the base station, information indicating a mobile device type for the mobile device, and can receive, from the FWA device and via the base station, information indicating a FWA device type for the FWA device.

As further shown in FIG. 1A, and by reference number 110, the device identification platform can determine mechanisms to identify the device types, of the user devices, to the base station and/or the network. In some implementations, and as described below, the mechanisms can include a device type field that indicates a device type of a user device to a network device (e.g., the base station), a device profile identifier that indicates a device type of a user device to the network device, an assistance information message that indicates a device type of a user device to the network device, and/or the like.

In some implementations, the device identification platform can provide information indicating a different mechanism for different user devices. For example, the device identification platform can provide information indicating a first mechanism (e.g., a device type field that indicates a device type of a user device to a network device) to a base station associated with the mobile device, and can provide information indicating a second mechanism (e.g., a device profile identifier that indicates a device type of a user device to the network device) to a base station associated with the FWA device. In some implementations, the device identification platform can provide information indicating one or more of the mechanisms for a user device. For example, the device identification platform can provide information indicating a first mechanism (e.g., a device type field that indicates a device type of a user device to a network device) and a third mechanism (e.g., an assistance information message that indicates a device type of a user device to the network device) to a base station associated with the mobile device. In another example, the device identification platform can provide information indicating the second mechanism (e.g., a device profile identifier that indicates a device type of a user device to the network device) and the third mechanism (e.g., an assistance information message that indicates a device type of a user device to the network device) to a base station associated with the FWA device.

In some implementations, the device identification platform can determine the mechanism to identify the device type based on user devices associated with the network, a type of network being utilized by the user devices, a type of base station being utilized by the user devices, and/or the like. For example, the device identification platform can determine that the first mechanism is to be used with 4G mobile devices, 4G networks, eNodeBs, and/or the like; that the second mechanism is to be used with 5G mobile devices and FWA devices, 5G networks, gNodeBs, and/or the like; that the third mechanism is to be used with 4G and 5G mobile devices and FWA devices, 4G and 5G networks, eNodeBs and gNodeBs; and/or the like.

Figure 1B:
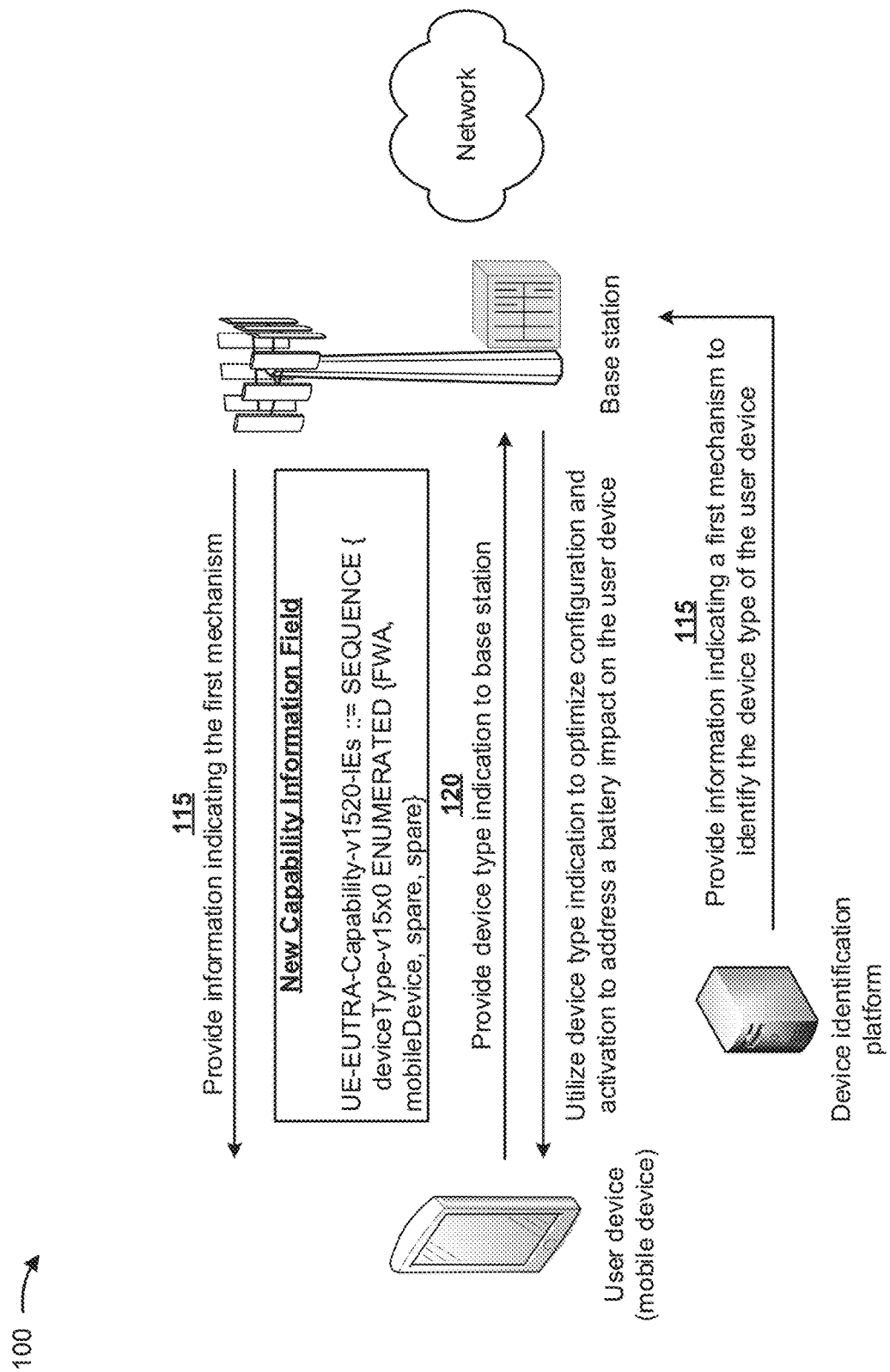

As shown in FIG. 1B, and by reference number 115, based on determining a first mechanism to identify a device type, of the mobile device, to the base station and/or the network, the device identification platform can provide, to the base station, information indicating the first mechanism to identify the device type of the mobile device. The base station can provide, to the mobile device, the information indicating the first mechanism to identify the device type of the mobile device. In some implementations, the first mechanism can include a device type field that indicates the device type of the mobile device to base station. The user device can receive the information indicating the first mechanism to identify the device type of the mobile device, and can utilize the information to indicate the device type of the mobile device to the base station, as described below.

As further shown in FIG. 1B, and by reference number 120, based on receiving the information indicating the first mechanism to identify the device type of the mobile device, the mobile device can provide a device type indication (e.g., identifying the user device as a mobile device) to the base station. In some implementations, the first mechanism can include adding a new device type field (e.g., identifying the user device as a mobile device) to capability information (e.g., signaled to the base station) as follows:

```
UE-EUTRA-Capability-v1510-IEs ::= SEQUENCE {
    irat-ParametersNR-r15 IRAT-ParametersNR-r15 OPTIONAL,
    featureSetsEUTRA-r15 FeatureSetsEUTRA-r15 OPTIONAL,
    pdcp-ParametersNR-r15 PDCP-ParametersNR-r15 OPTIONAL,
    fdd-Add-UE-EUTRA-Capabilities-v1510 UE-EUTRA-
    CapabilityAddXDD-Mode-v1510
OPTIONAL,
    tdd-Add-UE-EUTRA-Capabilities-v1510 UE-EUTRA-
```

-continued

```
    CapabilityAddXDD-Mode-v1510
OPTIONAL,
    nonCriticalExtension UE-EUTRA-Capability-v1520-IEs OPTIONAL
}
UE-EUTRA-Capability-v1520-IEs ::= SEQUENCE {
    measParameters-v1520 MeasParameters-v1520,
    nonCriticalExtension UE-EUTRA-Capability-v15x0-IEs OPTIONAL
}
UE-EUTRA-Capability-v1520-IEs ::= SEQUENCE {
    deviceType-v15x0 ENUMERATED
{FWA, mobileDevice, spare, spare, spare, spare,
spare}
}.
```

The new device type field can include the text provided in bold and italics.

In some implementations, the first mechanism to identify the device type of the mobile device can provide a clear and simple indication of the device type and does not require an existing procedure change, and user device behavior can remain the same across different types of networks. In some implementations, and as further shown in FIG. 1B, the base station can utilize the device type indication provided by the mobile device to optimize a configuration and/or an activation of the mobile device and to address an impact on a battery of the mobile device. For example, the base station can configure the mobile device to utilize a data threshold that shifts data between the base station and the network in order to minimize an impact on the battery of the model device, can optimize a carrier aggregation configuration of the mobile device by enabling the mobile device and the network to utilize multiple carrier frequencies, and/or the like.

Figure 1C:
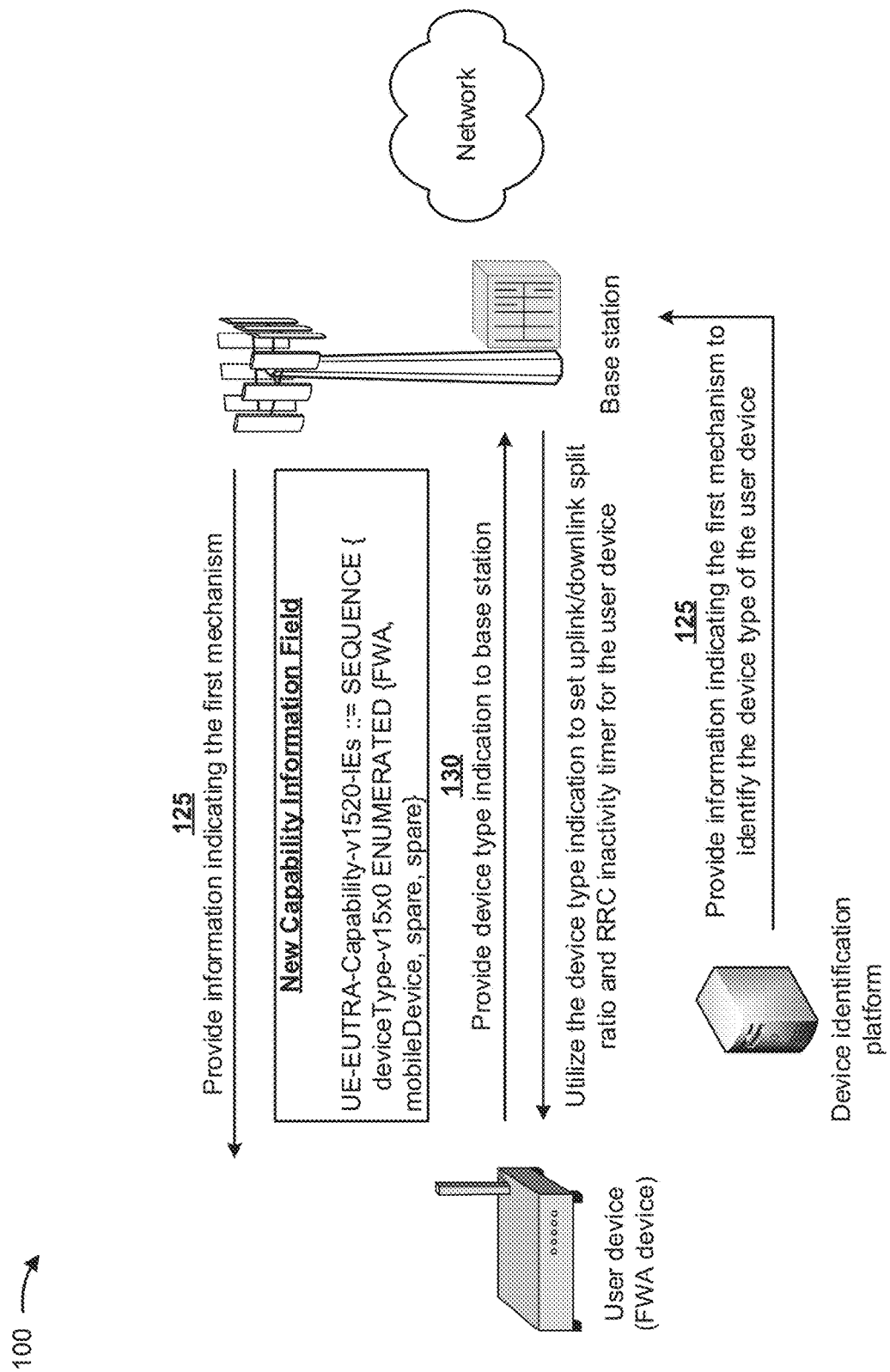

As shown in FIG. 1C, and by reference number 125, based on determining a first mechanism to identify a device type, of the FWA device, to the base station and/or the network, the device identification platform can provide, to the base station, information indicating the first mechanism to identify the device type of the FWA device. The base station can provide, to the FWA device, the information indicating the first mechanism to identify the device type of the FWA device. In some implementations, the first mechanism can include a device type field that indicates the device type of the FWA device to base station. The user device can receive the information indicating the first mechanism to identify the device type of the FWA device, and can utilize the information to indicate the device type of the FWA device to the base station, as described below.

As further shown in FIG. 1C, and by reference number 130, based on receiving the information indicating the first mechanism to identify the device type of the FWA device, the FWA device can provide a device type indication (e.g., identifying the user device as a FWA device) to the base station. In some implementations, the first mechanism can include adding a new device type field (e.g., identifying the user device as a FWA device) to capability information (e.g., signaled to the base station) as follows:

```
UE-EUTRA-Capability-v1510-IEs ::= SEQUENCE {
    irat-ParametersNR-r15 IRAT-ParametersNR-r15 OPTIONAL,
    featureSetsEUTRA-r15 FeatureSetsEUTRA-r15 OPTIONAL,
    pdcp-ParametersNR-r15 PDCP-ParametersNR-r15 OPTIONAL,
    fdd-Add-UE-EUTRA-Capabilities-v1510 UE-EUTRA-
    CapabilityAddXDD-Mode-v1510
OPTIONAL,
    tdd-Add-UE-EUTRA-Capabilities-v1510 UE-EUTRA-
    CapabilityAddXDD-Mode-v1510
```

-continued

```
OPTIONAL,
    nonCriticalExtension UE-EUTRA-Capability-v1520-IEs OPTIONAL
}
UE-EUTRA-Capability-v1520-IEs ::= SEQUENCE {
    measParameters-v1520 MeasParameters-v1520,
    nonCriticalExtension UE-EUTRA-Capability-v15x0-IEs OPTIONAL
}
UE-EUTRA-Capability-v1520-IEs ::= SEQUENCE {
    deviceType-v15x0 ENUMERATED
{FWA, mobileDevice, spare, spare, spare, spare,
spare}
}.
```

The new device type field can include the text provided in bold and italics.

In some implementations, the first mechanism to identify the device type of the FWA device can provide a clear and simple indication of the device type and does not require an existing procedure change, and user device behavior can remain the same across different types of networks. In some implementations, and as further shown in FIG. 1C, the base station can utilize the device type indication provided by the FWA device to set an uplink/downlink split ratio and a RRC inactivity timer for the FWA device. For example, the base station can set the uplink/downlink split ratio for the FWA device to a value conducive to the FWA device, can set the RRC inactivity timer to a large value to keep the FWA device in a connected mode longer, can cause the FWA device to be configured with a connection to the base as soon as the FWA device is in a connected mode, can cause the network to push Internet traffic to the FWA device, and/or the like.

Figure 1D:
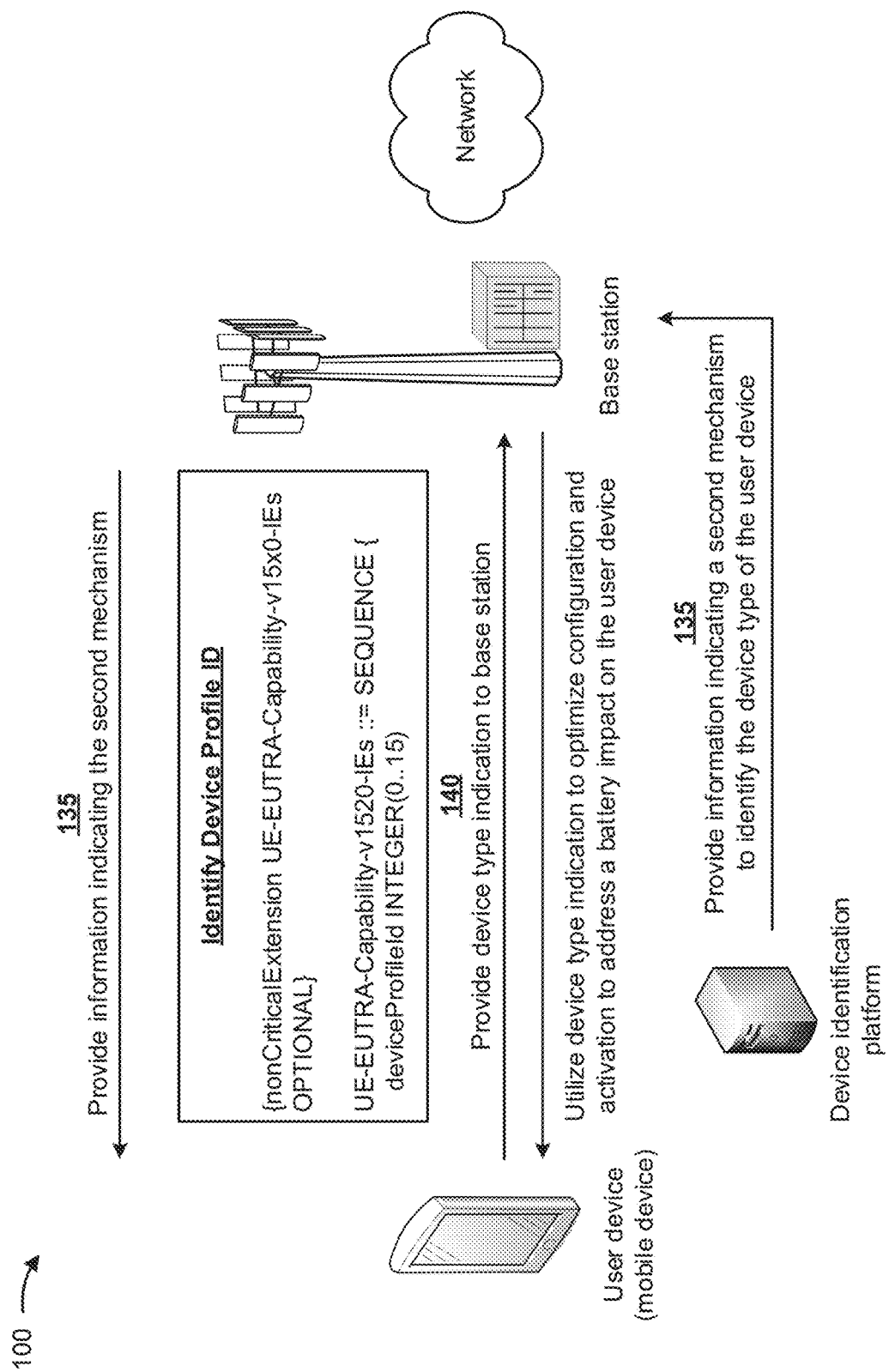

As shown in FIG. 1D, and by reference number 135, based on determining a second mechanism to identify a device type, of the mobile device, to the base station and/or the network, the device identification platform can provide, to the base station, information indicating the second mechanism to identify the device type of the mobile device. The base station can provide, to the mobile device, the information indicating the second mechanism to identify the device type of the mobile device. In some implementations, the second mechanism can include a device profile identifier field that indicates the device type of the mobile device to base station. In some implementations, a service provider of the mobile device can define a device configuration profile that indicates the device type of the mobile device via a public land mobile network (PLMN) identifier of a network (e.g., a cell) to which the mobile device is connected, and the mobile device may report the device profile identifier field based on the device configuration profile. The user device can receive the information indicating the second mechanism to identify the device type of the mobile device, and can utilize the information to indicate the device type of the mobile device to the base station, as described below.

As further shown in FIG. 1D, and by reference number 140, based on receiving the information indicating the second mechanism to identify the device type of the mobile device, the mobile device can provide a device type indication (e.g., identifying the user device as a mobile device) to the base station. In some implementations, the second mechanism can include adding a new device profile identifier field (e.g., identifying the user device as a mobile device) to capability information (e.g., signaled to the base station) as follows:

```
UE-EUTRA-Capability-v1510-IEs ::= SEQUENCE {
    irat-ParametersNR-r15 IRAT-ParametersNR-r15 OPTIONAL,
    featureSetsEUTRA-r15 FeatureSetsEUTRA-r15 OPTIONAL,
    pdcp-ParametersNR-r15 PDCP-ParametersNR-r15 OPTIONAL,
    fdd-Add-UE-EUTRA-Capabilities-v1510 UE-EUTRA-
    CapabilityAddXDD-Mode-v1510
    OPTIONAL,
    tdd-Add-UE-EUTRA-Capabilities-v1510 UE-EUTRA-
    CapabilityAddXDD-Mode-v1510
OPTIONAL,
    nonCriticalExtension UE-EUTRA-Capability-v1520-IEs OPTIONAL
}
UE-EUTRA-Capability-v1520-IEs ::= SEQUENCE {
    measParameters-v1520 MeasParameters-v1520,
    nonCriticalExtension UE-EUTRA-Capability-v15x0-IEs OPTIONAL
}
UE-EUTRA-Capability-v1520-IEs ::= SEQUENCE {
    deviceProfileId INTEGER(0..15)
}.
```

The new device profile identifier field can include the text provided in bold and italics (e.g., where different integers can indicate device profiles associated with different types of user devices).

In some implementations, the second mechanism to identify the device type of the mobile device can provide a clear and simple indication of the device type, does not require an existing procedure change, and enables a user of the user device to define different device profiles. In some implementations, and as further shown in FIG. 1D, the base station can utilize the device type indication provided by the mobile device to optimize a configuration and/or an activation of the mobile device and to address an impact on a battery of the mobile device. For example, the base station can configure the mobile device to utilize a data threshold that shifts data between the base station and the network in order to minimize an impact on the battery of the model device, can optimize a carrier aggregation configuration of the mobile device by enabling the mobile device and the network to utilize multiple carrier frequencies, and/or the like.

Figure 1E:
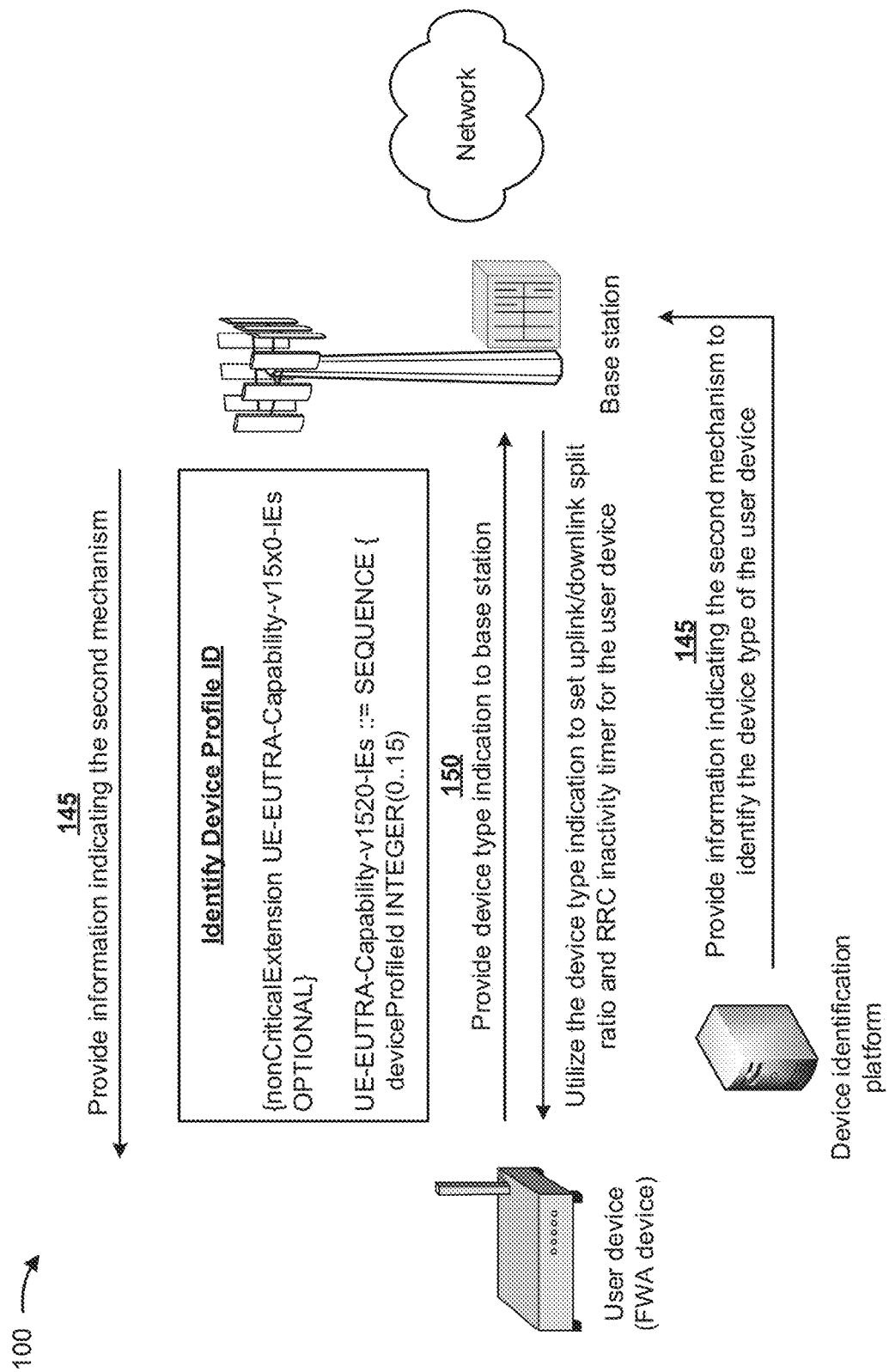

As shown in FIG. 1E, and by reference number 145, based on determining a second mechanism to identify a device type, of the FWA device, to the base station and/or the network, the device identification platform can provide, to the base station, information indicating the second mechanism to identify the device type of the FWA device. The base station can provide, to the FWA device, the information indicating the second mechanism to identify the device type of the FWA device. In some implementations, the second mechanism can include a device profile identifier field that indicates the device type of the FWA device to the base station. In some implementations, a service provider of the FWA device can define a device configuration profile that indicates the device type of the FWA device via a PLMN identifier of a network (e.g., a cell) to which the FWA device is connected, and the FWA device may report the device profile identifier field based on the device configuration profile. The user device can receive the information indicating the second mechanism to identify the device type of the FWA device, and can utilize the information to indicate the device type of the FWA device to the base station, as described below.

As further shown in FIG. 1E, and by reference number 150, based on receiving the information indicating the second mechanism to identify the device type of the FWA device, the FWA device can provide a device type indication (e.g., identifying the user device as a FWA device) to the base station. In some implementations, the second mechanism can include adding a new device profile identifier field (e.g., identifying the user device as a FWA device) to capability information (e.g., signaled to the base station) as follows:

```
UE-EUTRA-Capability-v1510-IEs ::= SEQUENCE {
    irat-ParametersNR-r15 IRAT-ParametersNR-r15 OPTIONAL,
    featureSetsEUTRA-r15 FeatureSetsEUTRA-r15 OPTIONAL,
    pdcp-ParametersNR-r15 PDCP-ParametersNR-r15 OPTIONAL,
    fdd-Add-UE-EUTRA-Capabilities-v1510 UE-EUTRA-
      CapabilityAddXDD-Mode-v1510
    OPTIONAL,
    tdd-Add-UE-EUTRA-Capabilities-v1510 UE-EUTRA-
      CapabilityAddXDD-Mode-v1510
    OPTIONAL,
    nonCriticalExtension UE-EUTRA-Capability-v1520-IEs OPTIONAL
}
UE-EUTRA-Capability-v1520-IEs ::= SEQUENCE {
    measParameters-v1520 MeasParameters-v1520,
    nonCriticalExtension UE-EUTRA-Capability-v15x0-IEs OPTIONAL
}
UE-EUTRA-Capability-v1520-IEs ::= SEQUENCE {
    deviceProfileId INTEGER(0..15)
}.
```

The new device profile identifier field can include the text provided in bold and italics (e.g., where different integers can indicate device profiles associated with different types of user devices).

In some implementations, the second mechanism to identify the device type of the FWA device can provide a clear and simple indication of the device type, does not require an existing procedure change, and enables a user of the user device to define different device profiles. In some implementations, and as further shown in FIG. 1E, the base station can utilize the device type indication provided by the FWA device to set an uplink/downlink split ratio and a RRC inactivity timer for the FWA device. For example, the base station can set the uplink/downlink split ratio for the FWA device to a value conducive to the FWA device, can set the RRC inactivity timer to a large value to keep the FWA device in a connected mode longer, can cause the FWA device to be configured with a connection to the base as soon as the FWA device is in a connected mode, can cause the network to push Internet traffic to the FWA device, and/or the like.

As shown in FIG. 1F, and by reference number 155, based on determining a third mechanism to identify a device type, of the mobile device, to the base station and/or the network, the device identification platform can provide, to the base station, information indicating the third mechanism to identify the device type of the mobile device. The base station can provide, to the mobile device, the information indicating the third mechanism to identify the device type of the mobile device. In some implementations, the third mechanism can include using a power preferred indication in an assistance information message. In some implementations, the power preferred indication can indicate "low power consumption," which identifies the device type of the mobile device to the base station. The user device can receive the information indicating the third mechanism to identify the device type of the mobile device, and can utilize the information to indicate the device type of the mobile device to the base station, as described below.

As further shown in FIG. 1F, and by reference number 160, based on receiving the information indicating the third mechanism to identify the device type of the mobile device, the mobile device can provide the power preferred indication (e.g., identifying the user device as a mobile device based on a low power consumption indication), via the assistance information message, to the base station. In some implementations, the third mechanism can include setting the power preferred indication (e.g., identifying the user device as a mobile device based on a low power consumption indication) in the assistance information message (e.g., signaled to the base station) as follows:

```
UEAssistanceInformation-r11-IEs ::= SEQUENCE {
    powerPrefIndication-r11 ENUMERATED
    {lowPowerConsumption} OPTIONAL,
    lateNonCriticalExtension    OCTET STRING OPTIONAL,
    nonCriticalExtension   UEAssistanceInformation-
    v1430-IEs  OPTIONAL
}.
```

The power preferred indication can include the text provided in bold and italics.

In some implementations, the third mechanism to identify the device type of the mobile device does not require an existing specification change. In some implementations, and as further shown in FIG. 1F, the base station can utilize the device type indication provided by the mobile device to optimize a configuration and/or an activation of the mobile device and to address an impact on a battery of the mobile device. For example, the base station can configure the mobile device to utilize a data threshold that shifts data between the base station and the network in order to minimize an impact on the battery of the model device, can optimize a carrier aggregation configuration of the mobile device by enabling the mobile device and the network to utilize multiple carrier frequencies, and/or the like.

Figure 1G:
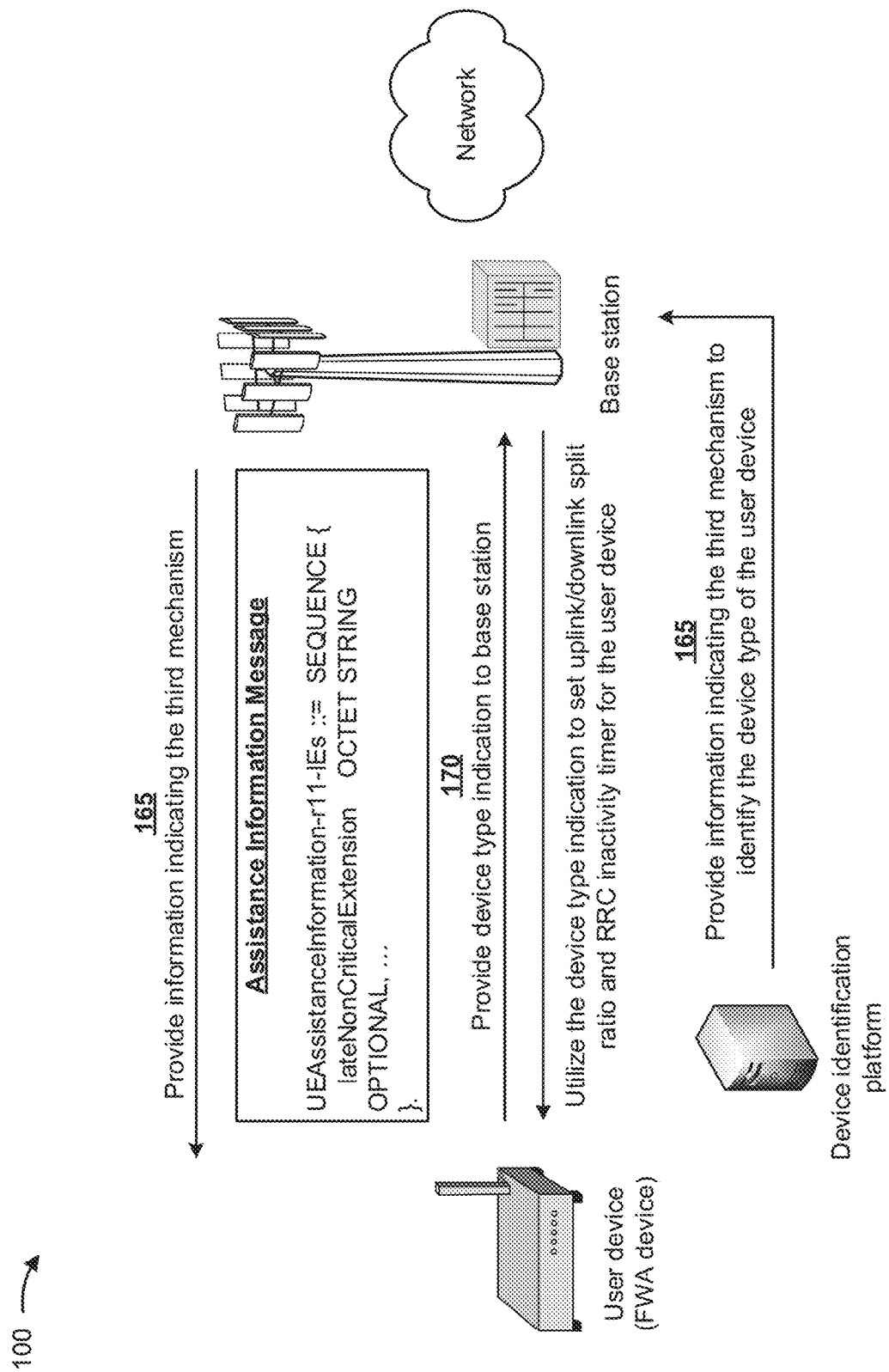

As shown in FIG. 1G, and by reference number 165, based on determining a third mechanism to identify a device type, of the FWA device, to the base station and/or the network, the device identification platform can provide, to the base station, information indicating the third mechanism to identify the device type of the FWA device. The base station can provide, to the FWA device, the information indicating the third mechanism to identify the device type of the FWA device. In some implementations, the third mechanism can include omitting a power preferred indication from an assistance information message. In some implementations, omitting the power preferred indication can indicate, to the base station, that low power consumption mode is not required and can identify the device type of the FWA device. The user device can receive the information indicating the third mechanism to identify the device type of the FWA device, and can utilize the information to indicate the device type of the FWA device to the base station, as described below.

As further shown in FIG. 1G, and by reference number 170, based on receiving the information indicating the third mechanism to identify the device type of the FWA device, the FWA device can provide the power preferred indication (e.g., identifying the user device as a FWA device based on a normal indication), via the assistance information message, to the base station. In some implementations, the third mechanism can include omitting the power preferred indication from the assistance information message (e.g., signaled to the base station) as follows:

```
UEAssistanceInformation-r11-IEs ::= SEQUENCE {
    lateNonCriticalExtension   OCTET STRING OPTIONAL,
    nonCriticalExtension   UEAssistanceInformation-v1430-
    IEs  OPTIONAL
}.
```

The absence of power preferred indication from the assistance information message can indicate (e.g., to the base station) that a low power consumption mode is not required (e.g., for the FWA device).

In some implementations, the third mechanism to identify the device type of the FWA device does not require an existing specification change. In some implementations, and as further shown in FIG. 1G, the base station can utilize the device type indication provided by the FWA device to set an uplink/downlink split ratio and a RRC inactivity timer for the FWA device. For example, the base station can set the uplink/downlink split ratio for the FWA device to a value conducive to the FWA device, can set the RRC inactivity timer to a large value to keep the FWA device in a connected mode longer, can cause the FWA device to be configured with a connection to the base as soon as the FWA device is in a connected mode, can cause the network to push Internet traffic to the FWA device, and/or the like.

In this way, several different stages of the process for signaling an indication of a user device type to a network to allow an optimized network configuration for the user device are automated, which can remove human subjectivity and waste from the process, and which can improve speed and efficiency of the process and conserve computing resources (e.g., processing resources, memory resources, and/or the like). Furthermore, implementations described herein use a rigorous, computerized process to perform tasks or roles that were not previously performed. For example, currently there does not exist a technique for signaling an indication of a user device type to a network to allow an optimized network configuration for the user device. Finally, automating the process for signaling an indication of a user device type to a network to allow an optimized network configuration for the user device conserves computing resources (e.g., processing resources, memory resources, and/or the like) that would otherwise be wasted in attempting to identify a type associated with a user device.

As indicated above, FIGS. 1A-1G are provided merely as examples. Other examples are possible and can differ from what was described with regard to FIGS. 1A-1G. The number and arrangement of devices and networks shown in FIGS. 1A-1G are provided as an example. In practice, there can be additional devices and/or networks, fewer devices and/or networks, different devices and/or networks, or differently arranged devices and/or networks than those shown in FIGS. 1A-1G. Furthermore, two or more devices shown in FIGS. 1A-1G can be implemented within a single device, or a single device shown in FIGS. 1A-1G can be implemented as multiple, distributed devices. Additionally, or alternatively, a set of devices (e.g., one or more devices) of FIGS. 1A-1G can perform one or more functions described as being performed by another set of devices of FIGS. 1A-1G.

Figure 2:
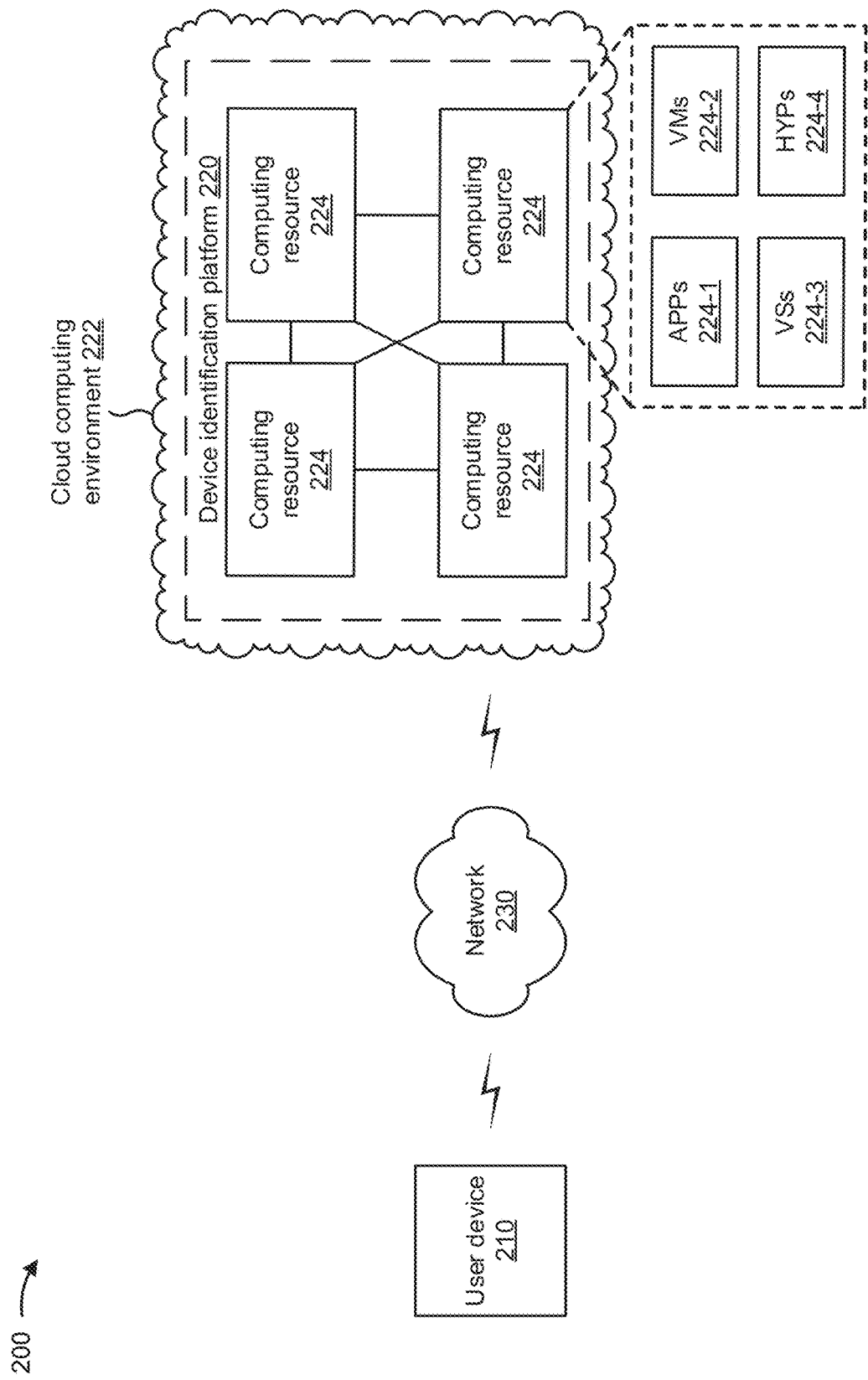
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a device identification platform 220, and a network 230. Devices of environment 200 can interconnect via wired connections, wireless connections, or a combination of wired and wireless connections.

User device 210 includes one or more devices capable of receiving, generating, storing, processing, and/or providing information, such as information described herein. For example, user device 210 can include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, etc.), a mobile hotspot device, a fixed wireless access device, customer premises equipment, or a similar type of device. In some implementations, user device 210 can receive information from and/or transmit information to device identification platform 220 and/or network 230.

Device identification platform 220 includes one or more devices that enable signaling of an indication of a user device type to a network to allow an optimized network configuration for the user device. In some implementations, device identification platform 220 can be designed to be modular such that certain software components can be swapped in or out depending on a particular need. As such, device identification platform 220 can be easily and/or quickly reconfigured for different uses. In some implementations, device identification platform 220 can receive information from and/or transmit information to one or more user devices 210.

In some implementations, as shown, device identification platform 220 can be hosted in a cloud computing environment 222. Notably, while implementations described herein describe device identification platform 220 as being hosted in cloud computing environment 222, in some implementations, device identification platform 220 cannot be cloud-based (i.e., can be implemented outside of a cloud computing environment) or can be partially cloud-based.

Cloud computing environment 222 includes an environment that hosts device identification platform 220. Cloud computing environment 222 can provide computation, software, data access, storage, etc. services that do not require end-user knowledge of a physical location and configuration of system(s) and/or device(s) that hosts device identification platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host device identification platform 220. The cloud resources can include compute instances executing in computing resource 224, storage devices provided in computing resource 224, data transfer devices provided by computing resource 224, etc. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that can be provided to or accessed by user device 210. Application 224-1 can eliminate a need to install and execute the software applications on user device 210. For example, application 224-1 can include software associated with device identification platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., a user of user device 210 or an operator of device identification platform 220), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
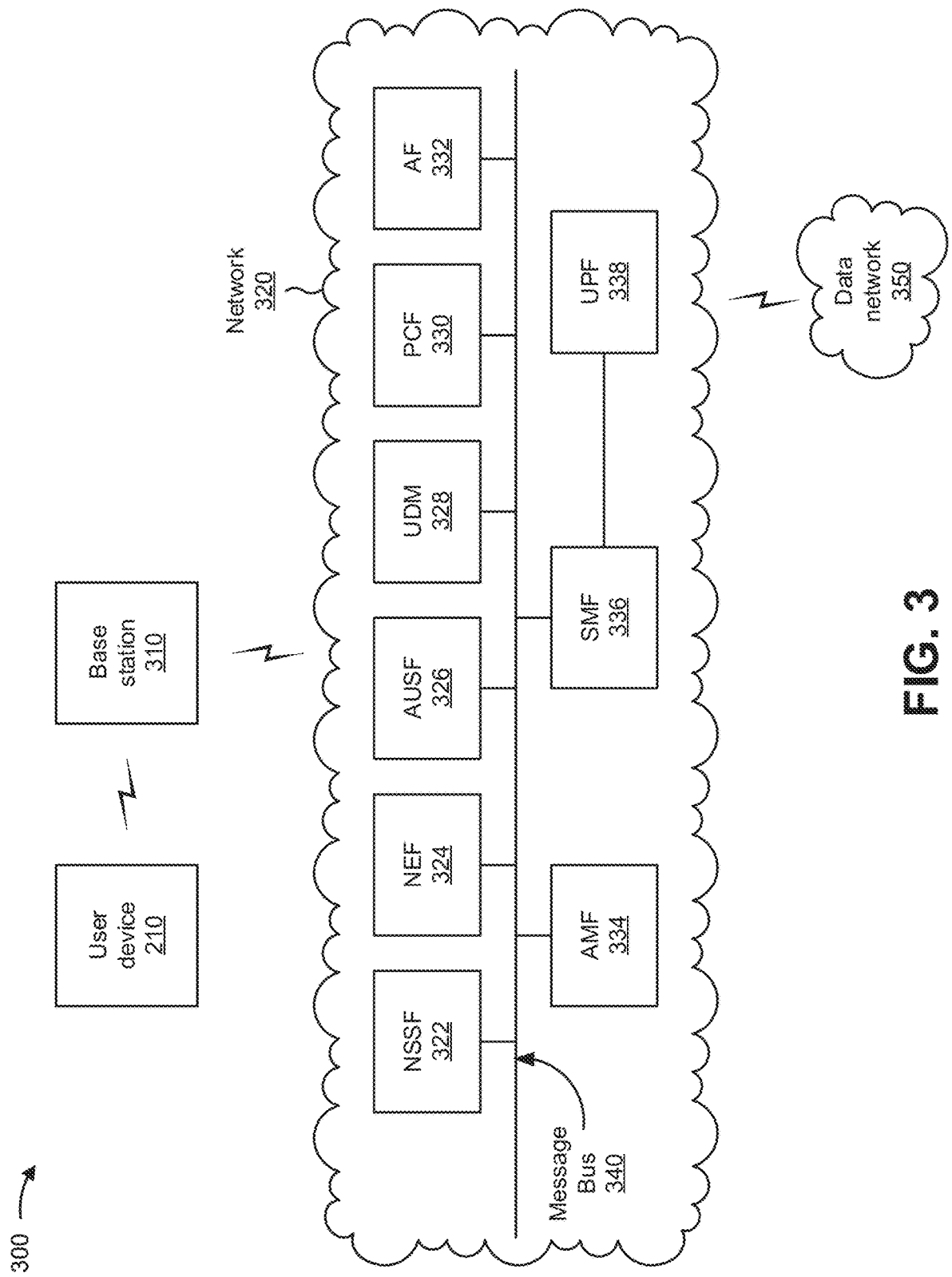
FIG. 3 is a diagram of an example network environment of the example environment shown in FIG. 2.

FIG. 3 is a diagram of an example network environment 300 of example environment 200 shown in FIG. 2. As shown in FIG. 3, example network environment 300 can include user device 210, a base station 310, a network 320, and a data network 350. In some implementations, network 320 and data network 350 can correspond to network 230 of FIG. 2. Devices and/or networks of example network environment 300 can interconnect via wired connections, wireless connections, or a combination of wired and wireless connections.

In some implementations, network 320 can include an example functional architecture in which systems and/or methods, described herein, can be implemented. For example, network 320 can include an example architecture of a 5G next generation (NG) core network included in a 5G wireless telecommunications system. While the example architecture of network 320 shown in FIG. 3 can be an example of a service-based architecture, in some implementations, network 320 can be implemented as a reference-point architecture.

As shown in FIG. 3, network 320 can include a number of functional elements. The functional elements can include, for example, a network slice selection function (NSSF) 322, a network exposure function (NEF) 324, an authentication server function (AUSF) 326, a unified data management (UDM) component 328, a policy control function (PCF) 330, an application function (AF) 332, an access and mobility management function (AMF) 334, a session management function (SMF) 336, a user plane function (UPF) 338, and/or the like. These functional elements can be communicatively connected via a message bus 340. Each of the functional elements shown in FIG. 3 is implemented on one or more devices associated with a wireless telecommunications system. In some implementations, one or more of the functional elements can be implemented on physical devices, such as an access point, a base station, a gateway, and/or the like. In some implementations, one or more of the functional elements can be implemented on a computing device of a cloud computing environment.

Base station 310 includes one or more devices capable of communicating with user device 210 using a cellular radio access technology (RAT). For example, base station 310 can include a base transceiver station, a radio base station, a node B, an eNodeB (eNB), a gNodeB (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 310 can transfer traffic between user device 210 (e.g., using a cellular RAT), other base stations 310 (e.g., using a wireless interface or a backhaul interface, such as a wired backhaul interface), and/or network 320. Base station 310 can provide one or more cells that cover geographic areas. Some base stations 310 can be mobile base stations. Some base stations 310 can communicate using multiple RATs.

In some implementations, base station 310 can perform scheduling and/or resource management for user devices 210 covered by base station 310 (e.g., user devices 210 covered by a cell provided by base station 310). In some implementations, base stations 310 can be controlled or coordinated by a network controller, which can perform load balancing, network-level configuration, and/or the like. The network controller can communicate with base stations 310 via a wireless or wireline backhaul. In some implementations, base station 310 can include a network controller, a self-organizing network (SON) module or component, or a similar module or component. In other words, base station 310 can perform network control, scheduling, and/or network management functions (e.g., for other base stations 310 and/or for uplink, downlink, and/or sidelink communications of user devices 210 covered by the base station 310). In some implementations, base station 310 can include a central unit and multiple distributed units. The central unit can coordinate access control and communication with regard to the multiple distributed units. The multiple distributed units can provide user devices 210 and/or other base stations 310 with access to the data network via the core network.

NSSF 322 includes one or more devices that select network slice instances for user device 210. By providing network slicing, NSSF 322 allows an operator to deploy multiple substantially independent end-to-end networks potentially with the same infrastructure. In some implementations, each slice can be customized for different services.

NEF 324 includes one or more devices that support exposure of capabilities and/or events in the wireless telecommunications system to help other entities in the wireless telecommunications system discover network services.

AUSF 326 includes one or more devices that act as an authentication server and support the process of authenticating user devices 210 in the wireless telecommunications system.

UDM 328 includes one or more devices that store subscriber data and profiles in the wireless telecommunications system. UDM 328 can be used for fixed access, mobile access, and/or the like, in network 320.

PCF 330 includes one or more devices that provide a policy framework that incorporates network slicing, roaming, packet processing, mobility management, and/or the like.

AF 332 includes one or more devices that support application influence on traffic routing, access to NEF 324, policy control, and/or the like.

AMF 334 includes one or more devices that act as a termination point for non-access stratum (NAS) signaling, mobility management, and/or the like.

SMF 336 includes one or more devices that support the establishment, modification, and release of communications sessions in the wireless telecommunications system. For example, SMF 336 can configure traffic steering policies at UPF 338, enforce user device IP address allocation and policies, and/or the like.

UPF 338 includes one or more devices that serve as an anchor point for intraRAT and/or interRAT mobility. UPF 338 can apply rules to packets, such as rules pertaining to packet routing, traffic reporting, handling user plane QoS, and/or the like.

Message bus 340 represents a communication structure for communication among the functional elements. In other words, message bus 340 can permit communication between two or more functional elements.

Data network 350 includes one or more wired and/or wireless data networks. For example, data network 350 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of network environment 300 can perform one or more functions described as being performed by another set of devices of network environment 300.

Figure 4:
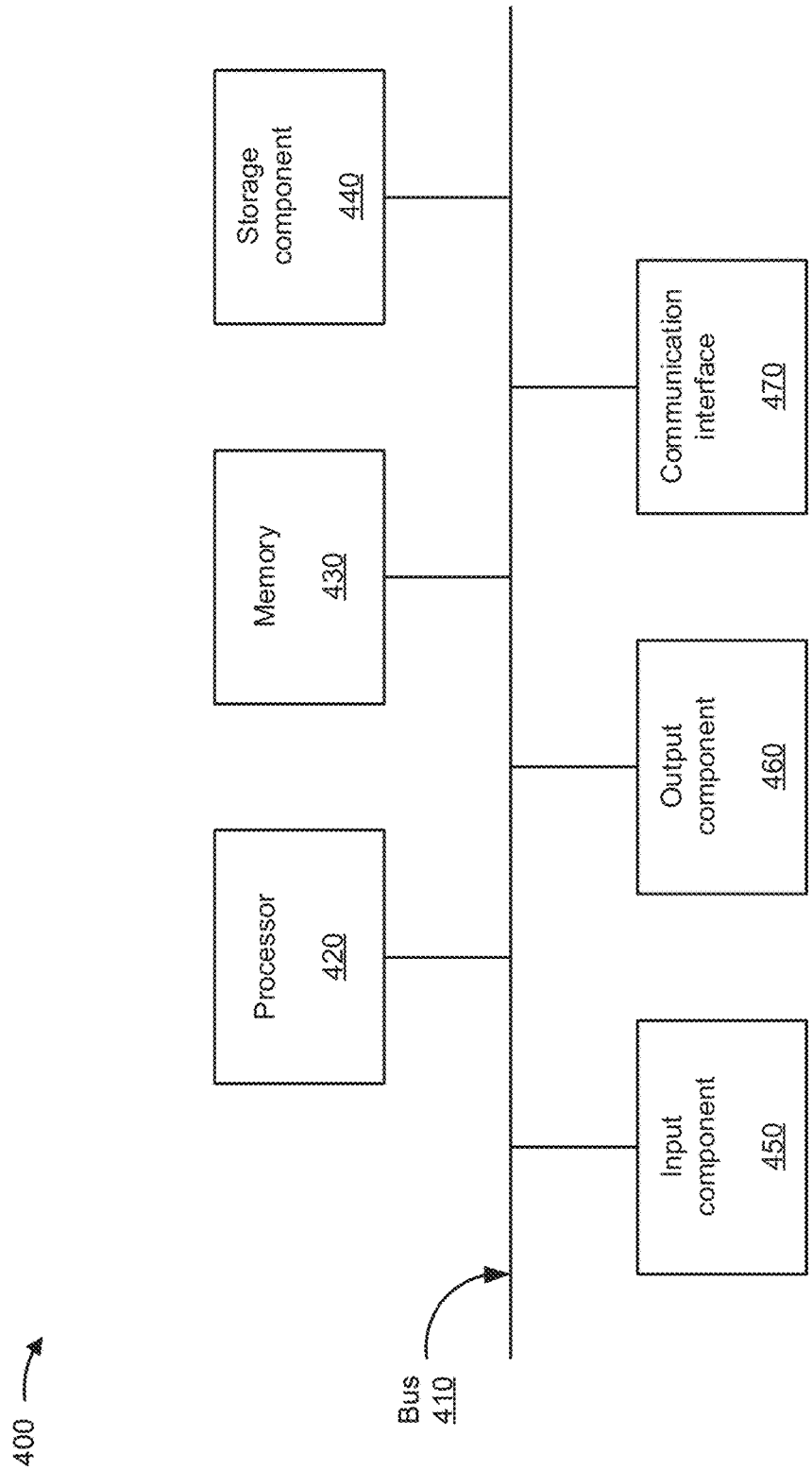
FIG. 4 is a diagram of example components of one or more devices of FIGS. 2 and 3.

FIG. 4 is a diagram of example components of a device 400. Device 400 can correspond to user device 210, device identification platform 220, computing resource 224, base station 310, NSSF 322, NEF 324, AUSF 326, UDM 328, PCF 330, AF 332, AMF 334, SMF 336, and/or UPF 338. In some implementations, user device 210, device identification platform 220, computing resource 224, base station 310, NSSF 322, NEF 324, AUSF 326, UDM 328, PCF 330, AF 332, AMF 334, SMF 336, and/or UPF 338 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a Wi-Fi interface, a cellular network interface, and/or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
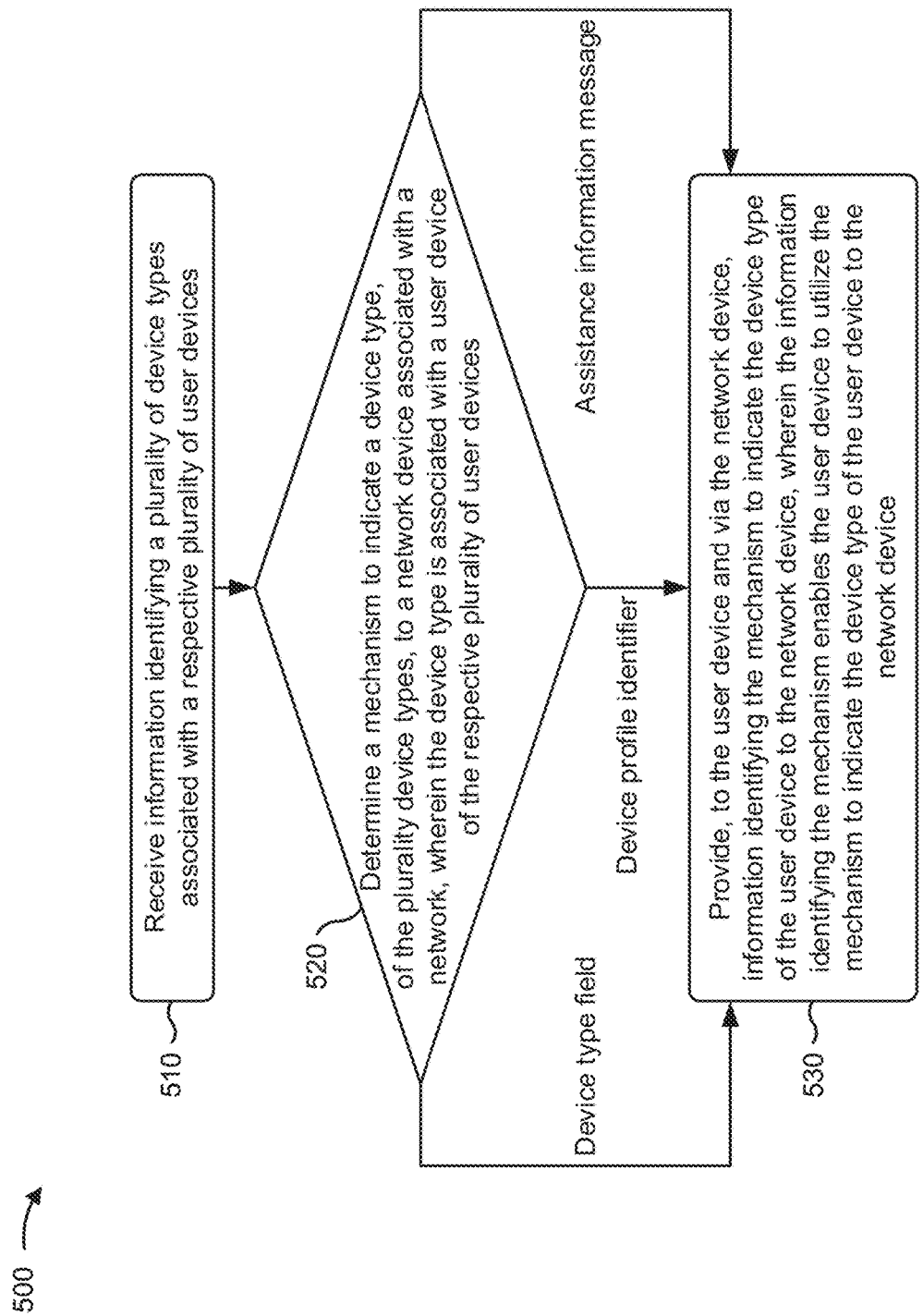
FIG. 5 is a flow chart of an example process for signaling an indication of a user device type to a network to allow an optimized network configuration for the user device.

FIG. 5 is a flow chart of an example process 500 for signaling an indication of a user device type to a network to allow an optimized network configuration for the user device. In some implementations, one or more process blocks of FIG. 5 can be performed by a device identification platform (e.g., device identification platform 220). In some implementations, one or more process blocks of FIG. 5 can be performed by another device or a group of devices separate from or including the device identification platform, such as a user device (e.g., user device 210), a base station (e.g., base station 310), a NSSF (e.g., NSSF 322), a SMF (e.g., SMF 336), and/or a UPF (e.g., UPF 338).

As shown in FIG. 5, process 500 can include receiving information identifying a plurality of device types associated with a respective plurality of user devices (block 510). For example, the device identification platform (e.g., using computing resource 224, processor 420, communication interface 470, and/or the like) can receive information identifying a plurality of device types associated with a respective plurality of user devices, as described above in connection with FIGS. 1A-3.

As further shown in FIG. 5, process 500 can include determining a mechanism to indicate a device type, of the plurality device types, to a network device associated with a network, wherein the device type is associated with a user device of the respective plurality of user devices, and wherein the mechanism includes one of a device type field that indicates the device type of the user device to the network device, a device profile identifier that indicates the device type of the user device to the network device, or an assistance information message that indicates the device type of the user device to the network device (block 520). For example, the device identification platform (e.g., using computing resource 224, processor 420, memory 430, and/or the like) can determine a mechanism to indicate a device type, of the plurality device types, to a network device associated with a network, as described above in connection with FIGS. 1A-3. In some implementations, the device type can be associated with a user device of the respective plurality of user devices, and the mechanism can include a device type field that indicates the device type of the user device to the network device, a device profile identifier that indicates the device type of the user device to the network device, and/or an assistance information message that indicates the device type of the user device to the network device.

As further shown in FIG. 5, process 500 can include providing, to the user device and via the network device, information identifying the mechanism to indicate the device type of the user device to the network device, wherein the information identifying the mechanism enables the user device to utilize the mechanism to indicate the device type of the user device to the network device (block 530). For example, the device identification platform (e.g., using computing resource 224, processor 420, storage component 440, communication interface 470, and/or the like) can provide, to the user device and via the network device, information identifying the mechanism to indicate the device type of the user device to the network device, as described above in connection with FIGS. 1A-3. In some implementations, the information identifying the mechanism can enable the user device to utilize the mechanism to indicate the device type of the user device to the network device.

Process 500 can include additional implementations, such as any single implementation or any combination of implementations described below and/or described with regard to any other process described herein.

In some implementations, the user device can include one of a mobile device, a fixed wireless access device, or another type of user device. In some implementations, when the mechanism includes the device type field, the device identification platform can provide, to the user device, information instructing the user device to include the device type field with user device capability information. In some implementations, when the mechanism includes the device profile identifier, the device identification platform can provide, to the user device, information instructing the user device to include a field, indicating the device profile identifier, with user device capability information. In some implementations, when the mechanism includes the assistance information message, the device identification platform can provide, to the user device, information instructing the user device to include a field, indicating a power preference indicator for the user device, with the assistance information message.

In some implementations, when the user device is a mobile device, the mechanism can enable the network device to optimize a configuration and an activation of the user device to address an impact on a battery of the user device. In some implementations, when the user device is a fixed wireless access device, the mechanism can enable the network device to set an uplink/downlink split ratio and a radio resource control (RRC) inactivity timer for the user device.

In some implementations, when the user device is a mobile device, the mechanism can enable the network device to optimize a configuration and an activation of the user device to address an impact on a battery of the user device, and when the user device is a fixed wireless access device, the mechanism can enable the network device to set an uplink/downlink split ratio and a radio resource control (RRC) inactivity timer for the user device.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, information identifying a plurality of device types associated with a respective plurality of user devices;
   determining, by the device and based on receiving the information identifying the plurality of device types, a mechanism to indicate a device type, of the plurality of device types, to a network device associated with a network,
   wherein the device type is associated with a user device of the respective plurality of user devices, and
   wherein the mechanism includes one of:
      a device type field that indicates the device type of the user device to the network device,
      a device profile identifier that indicates the device type of the user device to the network device, or
      an assistance information message that indicates the device type of the user device to the network device; and
   providing, by the device and to the user device via the network device, information identifying the mechanism to indicate the device type of the user device to the network device,
      wherein the information identifying the mechanism enables the user device to utilize the mechanism to indicate the device type of the user device to the network device.

2. The method of claim 1, wherein the user device includes one of a mobile device, a fixed wireless access device, or another type of user device.

3. The method of claim 1, wherein, when the mechanism includes the device type field, providing the information identifying the mechanism comprises:
   providing, to the user device via the network device, information instructing the user device to include the device type field with user device capability information.

4. The method of claim 1, wherein, when the mechanism includes the device profile identifier, providing the information identifying the mechanism comprises:
   providing, to the user device via the network device, information instructing the user device to include a field, indicating the device profile identifier, with user device capability information.

5. The method of claim 1, wherein, when the mechanism includes the assistance information message, providing the information identifying the mechanism comprises:
   providing, to the user device via the network device, information instructing the user device to include a field, indicating a power preference indicator for the user device, with the assistance information message.

6. The method of claim 1, wherein, when the user device is a mobile device, the mechanism enables the network device to optimize a configuration and an activation of the user device to address an impact on a battery of the user device.

7. The method of claim 1, wherein, when the user device is a fixed wireless access device, the mechanism enables the network device to set an uplink/downlink split ratio and a radio resource control (RRC) inactivity timer for the user device.

8. A device, comprising:
   one or more memories; and
   one or more processors, communicatively coupled to the one or more memories, to:
      receive information identifying a plurality of device types associated with a respective plurality of user devices;
      determine, based on receiving the information identifying the plurality of device types, a mechanism to indicate a device type, of the plurality of device types, to a network device associated with a network, wherein the device type is associated with a user device of the respective plurality of user devices, and wherein the mechanism includes one of:
a device type field that indicates the device type of the user device to the network device,
a device profile identifier that indicates the device type of the user device to the network device, or
an assistance information message that indicates the device type of the user device to the network device; and provide, to the user device via the network device, information identifying the mechanism to indicate the device type of the user device to the network device,
wherein the information identifying the mechanism enables the user device to utilize the mechanism to indicate the device type of the user device to the network device.

9. The device of claim 8, wherein the user device includes one of a mobile device, a fixed wireless access device, or another type of user device.

10. The device of claim 8, wherein, when the mechanism includes the device type field, the one or more processors, when providing the information identifying the mechanism, are to:
provide, to the user device via the network device, information instructing the user device to include the device type field with user device capability information.

11. The device of claim 8, wherein, when the mechanism includes the device profile identifier, the one or more processors, when providing the information identifying the mechanism are to:
provide, to the user device via the network device, information instructing the user device to include a field, indicating the device profile identifier, with user device capability information.

12. The device of claim 8, wherein, when the mechanism includes the assistance information message, the one or more processors, when providing the information identifying the mechanism are to:
provide, to the user device via the network device, information instructing the user device to include a field, indicating a power preference indicator for the user device, with the assistance information message.

13. The device of claim 8, wherein, when the user device is a mobile device, the mechanism enables the network device to optimize a configuration and an activation of the user device to address an impact on a battery of the user device.

14. The device of claim 8, wherein, when the user device is a fixed wireless access device, the mechanism enables the network device to set an uplink/downlink split ratio and a radio resource control (RRC) inactivity timer for the user device.

15. A non-transitory computer-readable medium storing instructions, the instructions comprising:
one or more instructions that, when executed by one or more processors of a device, cause the one or more processors to:
receive information identifying a plurality of device types associated with a respective plurality of user devices;
determine, based on receiving the information identifying the plurality of device types, a mechanism to indicate a device type, of the plurality of device types, to a network device associated with a network based on receiving the information identifying the plurality of device types,
wherein the device type is associated with a user device of the respective plurality of user devices, and
wherein the mechanism includes one of:
a device type field that indicates the device type of the user device to the network device,
a device profile identifier that indicates the device type of the user device to the network device, or
an assistance information message that indicates the device type of the user device to the network device; and
provide, to the user device via the network device, information identifying the mechanism to indicate the device type of the user device to the network device,
wherein the information identifying the mechanism enables the user device to utilize the mechanism to indicate the device type of the user device to the network device.

16. The non-transitory computer-readable medium of claim 15, wherein the user device includes one of a mobile device, a fixed wireless access device, or another type of user device.

17. The non-transitory computer-readable medium of claim 15, wherein, when the mechanism includes the device type field, the one or more instructions, that cause the one or more processors to provide the information identifying the mechanism, cause the one or more processors to:
provide, to the user device via the network device, information instructing the user device to include the device type field with user device capability information.

18. The non-transitory computer-readable medium of claim 15, wherein, when the mechanism includes the device profile identifier, the one or more instructions, that cause the one or more processors to provide the information identifying the mechanism, cause the one or more processors to:
provide, to the user device via the network device, information instructing the user device to include a field, indicating the device profile identifier, with user device capability information.

19. The non-transitory computer-readable medium of claim 15, wherein, when the mechanism includes the assistance information message, the one or more instructions, that cause the one or more processors to provide the information identifying the mechanism, cause the one or more processors to:
provide, to the user device via the network device, information instructing the user device to include a field, indicating a power preference indicator for the user device, with the assistance information message.

20. The non-transitory computer-readable medium of claim 15, wherein:
when the user device is a mobile device, the mechanism enables the network device to optimize a configuration and an activation of the user device to address an impact on a battery of the user device, and
when the user device is a fixed wireless access device, the mechanism enables the network device to set an uplink/downlink split ratio and a radio resource control (RRC) inactivity timer for the user device.

* * * * *